(12) United States Patent
Henikl et al.

(10) Patent No.: US 11,098,491 B2
(45) Date of Patent: Aug. 24, 2021

(54) LARGE MANIPULATOR HAVING AN ARTICULATED MAST THAT CAN BE QUICKLY FOLDED AND UNFOLDED

(71) Applicant: Schwing GmbH, Herne (DE)

(72) Inventors: Johannes Henikl, Dorsten (DE); Reiner Vierkotten, Oberhausen (DE); Andreas Lehmann, Moers (DE)

(73) Assignee: SCHWING GMBH, Herne (DE)

( * ) Notice: Subject to any disclaimer, the term of this patent is extended or adjusted under 35 U.S.C. 154(b) by 229 days.

(21) Appl. No.: 16/464,554

(22) PCT Filed: Nov. 30, 2017

(86) PCT No.: PCT/EP2017/081006
§ 371 (c)(1),
(2) Date: May 28, 2019

(87) PCT Pub. No.: WO2018/100074
PCT Pub. Date: Jun. 7, 2018

(65) Prior Publication Data
US 2020/0392747 A1 Dec. 17, 2020

(30) Foreign Application Priority Data
Nov. 30, 2016 (DE) .................... 10 2016 123 160.6

(51) Int. Cl.
*E04G 21/04* (2006.01)
*F15B 11/042* (2006.01)
(Continued)

(52) U.S. Cl.
CPC ........ *E04G 21/0463* (2013.01); *F15B 11/042* (2013.01); *F15B 11/046* (2013.01);
(Continued)

(58) Field of Classification Search
CPC ... E04G 21/0436; E04G 21/0463; B66F 9/20; F15B 20/00; F15B 11/042
See application file for complete search history.

(56) References Cited

U.S. PATENT DOCUMENTS

| 2008/0162005 A1 | 7/2008 | Tang et al. |
| 2011/0179783 A1* | 7/2011 | Pirri ..................... F15B 21/008 60/420 |
| 2016/0076263 A1 | 3/2016 | Tebeek et al. |

FOREIGN PATENT DOCUMENTS

| DE | 102013006232 A1 | 10/2014 |
| JP | 2013091933 A | 5/2013 |

OTHER PUBLICATIONS

International Preliminary Report on Patentability issued in PCT/EP2017/081006, dated Jun. 13, 2019 (English translation), 7 pages.
(Continued)

*Primary Examiner* — Abiy Teka
(74) *Attorney, Agent, or Firm* — Faegre Drinker Biddle & Reath LLP

(57) ABSTRACT

A large manipulator includes a chassis, a turntable arranged on the chassis and rotatable around a vertical axis via a rotary drive, and an articulated mast including two or more mast segments pivotably-movably connected, via articulated joints, with the respectively adjacent turntable or mast segment via a respective drive. The large manipulator further includes a mast sensor system configured to detect position of at least one point of the articulated mast or a pivot angle of at least one articulated joint and configured to generate sensor output signals. The large manipulator further includes a control device configured to actuate the drive in a normal operation for mast movement and to limit speed of movement of the articulated mast depending upon the sensor output signals. The drive is manually controllable in an emergency operation. The large manipulator further includes
(Continued)

Figure 1:
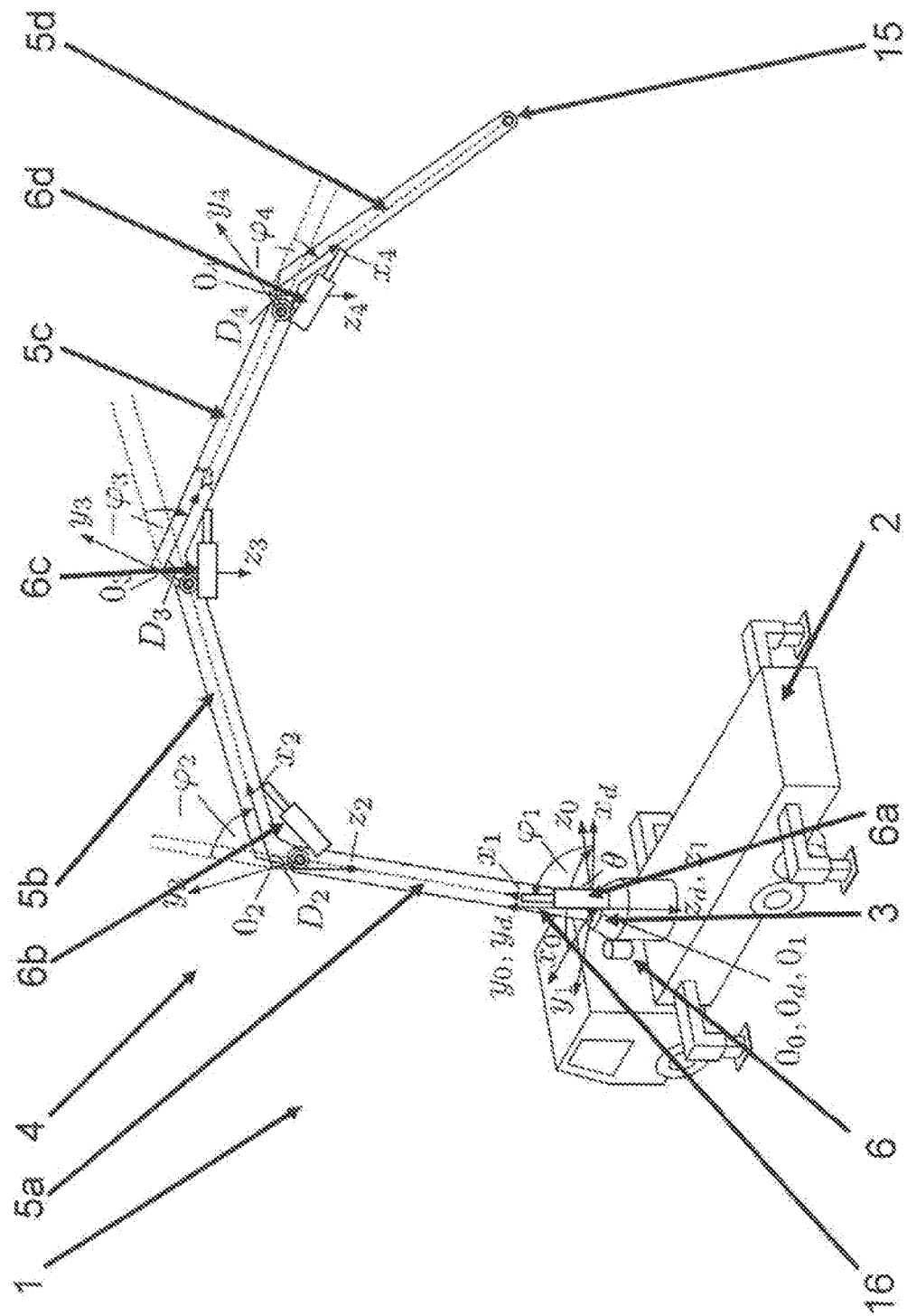

at least one limiting means, which, in the emergency operation, limit speed of the drive to a pre-specified maximum value.

15 Claims, 3 Drawing Sheets

(51) Int. Cl.
  *F15B 11/046* (2006.01)
  *F15B 20/00* (2006.01)
  *B65G 53/32* (2006.01)
(52) U.S. Cl.
  CPC .............. *F15B 20/00* (2013.01); *B65G 53/32* (2013.01); *E04G 21/0436* (2013.01); *F15B 2211/55* (2013.01); *F15B 2211/71* (2013.01); *F15B 2211/75* (2013.01); *F15B 2211/895* (2013.01)

(56) References Cited

OTHER PUBLICATIONS

International Search Report and Written Opinion issued in PCT/EP2017/081006, dated May 29, 2018 (English translation), 7 pages.

\* cited by examiner

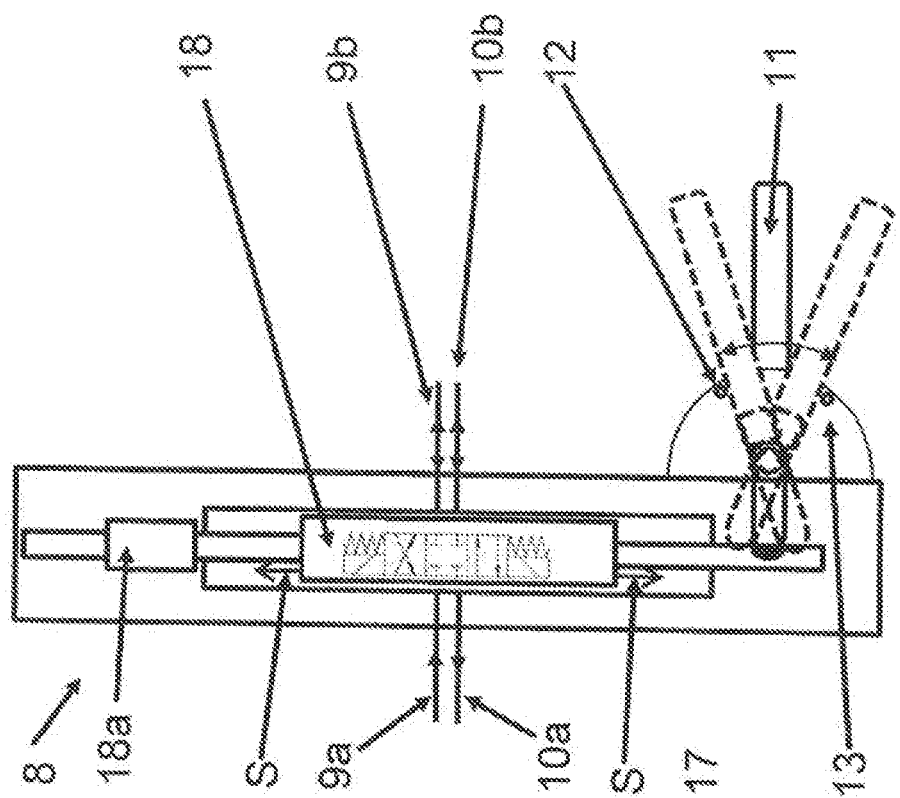
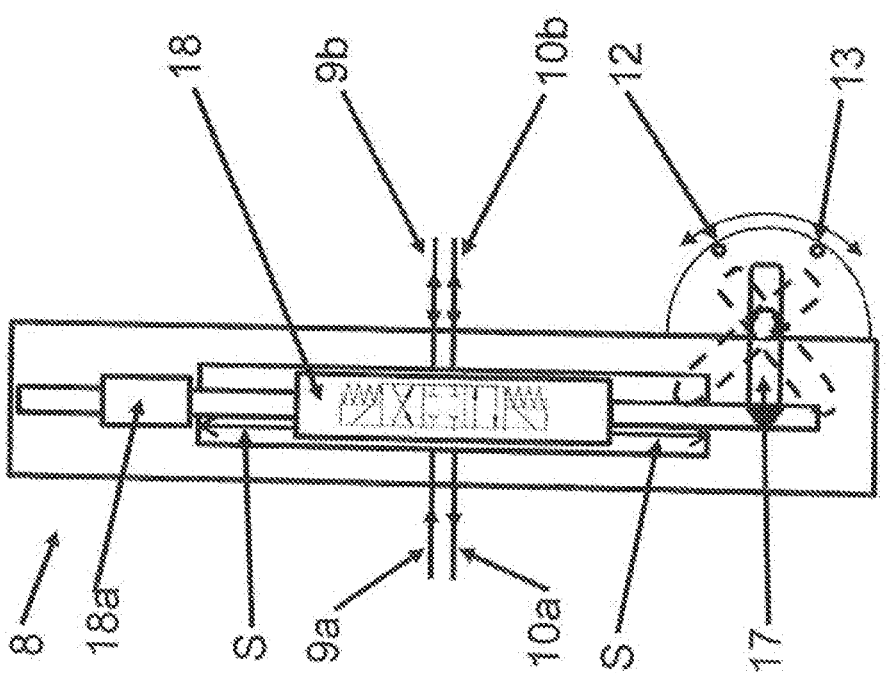

LARGE MANIPULATOR HAVING AN ARTICULATED MAST THAT CAN BE QUICKLY FOLDED AND UNFOLDED

CROSS-REFERENCE TO RELATED APPLICATION

This application is a U.S. 371 Application of International Application No. PCT/EP2017/081006, filed Nov. 30, 2017, which claims priority to Germany Patent Application No. 10 2016 123 160.6, filed Nov. 30, 2016, both of which are herein incorporated by reference in their entireties.

The invention relates to a large manipulator, in particular a truck-mounted concrete pump, with a turntable rotatable around a vertical axis by means of a rotary drive, which table is arranged on a chassis, an articulated mast, which includes two or more mast segments, wherein the mast segments are pivotably-movably connected, via articulated joints, with the respectively adjacent turntable or mast segment by means of in each case one drive, with a control device actuating the drives in a normal operation for the mast movement, and a mast sensor system for detecting the position of at least one point of the articulated mast or a pivot angle of at least one articulated joint.

In addition, the invention relates to a method for controlling the movement of an articulated mast of a large manipulator, in particular a truck-mounted concrete pump.

Large manipulators are known in a plurality of configurations from the prior art. WO 2014/166637 A1, for example, discloses a large manipulator with an articulated mast.

Hydraulic cylinders typically find use as drives, which are used for pivoting the mast segments around the articulated joints relative to the respectively adjacent mast segment or turntable. These are actuated by an electronic control device via proportionally functioning control valves, in order to be able to variably specify the traversing speed of the individual hydraulic cylinders. The traversing speed of the individual hydraulic cylinders is usually limited in known large manipulators, as a too-quick movement of the articulated mast constitutes a hazard to persons located in the vicinity. To ensure the operational safety, legal norms exist, which define the permissible maximum speed of the tip of the articulated mast.

In the prior art, the control valves of the hydraulic cylinders are actuated, via a remote control wirelessly connected or wire-connected with the control device. Alternatively, the control valves can, in an emergency operation, be controlled manually, via hand levers, for example. Here, the control valves are configured such that a certain position of an operating lever on the remote control corresponds to a defined volume flow of the hydraulic fluid, i.e. a defined travel speed of the respective hydraulic cylinder. Here, the control valves are configured such that, in simultaneous pivoting of all joints with maximum travel speed and completely outstretched articulated mast, the permitted top speed of the mast tip is not reached. This configuration of the control valves has the disadvantage that the legally allowed framework for the movement speed of the mast tip is very poorly utilized in most practical cases. The previously addressed "worst case", in which all joints are moved with maximum speed with a completely outstretched articulated mast, practically never arises. The limitation of the movement speed therefore leads, in most cases, to a very slow mast movement. Considerable temporal delays thereby result in the unfolding and folding of the articulated mast. This makes the operation inefficient.

The above-mentioned WO 2014/166637 A1 suggests a large manipulator, in which the control device provides a rapid traverse for the rotary drive of the turntable, in order to rotate the articulated mast into the desired working position with increased speed, wherein the rapid traverse is only then selectable if the mast or boom is completely collapsed. A single sensor, which cooperates with the control device, is provided in the known large manipulator, wherein it can be determined via the sensor if the articulated mast is completely collapsed or not. The sensor generates a release signal to the control device as long as it is ensured that the articulated mast is collapsed, and thusly has a minimal radius. In this state, the articulated mast can be rotated with increased speed.

In the large manipulator already known from the aforementioned document, the permitted framework for the speed of the mast tip is still insufficiently utilized. A rotational movement of the mast, with increased speed, is only possible in a completely collapsed articulated mast. In all partially unfolded positions, the articulated mast is, as heretofore, only displaced with reduced movement speed corresponding to the "worst case", namely in such a way that the legally-permitted maximum speed of the mast tip is never exceeded, independently of the mast position. In most cases, the achieved mast speed thusly still lies significantly below the legal permissions. The unfolding and the folding of the articulated mast still take too long.

Against this background, it is the object of the invention to make an improved large manipulator available. In particular, the articulated mast is meant to be able to be brought out of the completely folded state into its desired working position in minimal time. Likewise, the articulated mast is meant to be transferred out of the working position, in minimal time, into the completely folded position. In addition, the articulated mast is meant to be swiftly displaceable from one working position into another working position. Furthermore, it is also meant to be ensured that, in a malfunction of the electronic control of the articulated mast, i.e. if the articulated mast must be controlled manually, the legal norms regarding the permitted maximum speed of the mast movement are to be respected.

This object is achieved by the invention based on a large manipulator of the above type in that the control device is configured to limit the speed of the mast movement depending upon the momentary output signals of the mast sensor system, wherein the drives are manually controllable in an emergency operation, wherein at least one limiting means is provided which, in the emergency operation, limits the travel speed of at least one of the drives to a fixedly pre-specified maximum value. The invention thus archives the object in that the control device is configured to limit the speed of the mast movement, in that the travel speed of at least one of the drives is limited to a variable maximum value dependent upon the momentary output signals of the mast sensor system, wherein the drives are manually controllable in an emergency operation, wherein at least one limiting means is provided which, in the emergency operation, limits the traversing speed of at least one of the drives to a fixedly pre-specified maximum value.

The advantages achieved through the invention result therethrough that the maximum permitted speed of the mast movement, in the normal operation, can be optimally utilized and, in the emergency operation, the maximum permitted speed of the mast movement is likewise not exceeded.

The limiting means effective in the emergency operation limits the traversing speed of at least one of the drives to a fixedly pre-specified maximum value in such a manner that also in a manual controlling of the drive, the speed of the mast movement in the emergency operation does not exceed the legal requirements.

This is of decisive importance, as the drives are designed for the utilization according to the invention of the maximum permitted speed of the mast movement in the normal operation. This means that, in a manual controlling of the drives of the mast segments, i.e. without electronic controlling of the traversing speed through the control device, mast speeds are, in principle, achievable, which lie well over the legally permitted ones. In order to prevent such an exceeding in the emergency operation, according to the invention the limiting means, active only in the emergency operation, limits the traversing speed of at least one drive to a fixedly pre-specified maximum value. In this way, it can be prevented, with simple measures, that in a malfunction of the electronic control device or master sensor system, in a manual controlling of the mast, the speed of the mast movement exceeds the legally permitted provision.

Advantageous configurations and further developments of the invention result from the dependent claims.

According to an advantageous configuration of the invention, a control valve is provided which is connected with the hydraulic working lines of a drive, for the purpose of controlling the latter, wherein the control valve is actuated, in the normal operation, via the control device, which limits the adjustment of the mast segment in such a manner that a pre-specified, in particularly maximally permitted traversing speed is not exceeded. A control valve configured in such a manner ensures, in a simple way, that a traversing speed, pre-specified by the control device, for the adjustment of the mast segment, is not exceeded in the normal operation. To that end, the control valve regulates the in- and outflow of hydraulic fluid into the controlled drive via the hydraulic working lines connected with the drive.

A preferred embodiment provides that the control valve is configured as a proportional valve and has a travel path, and that the limiting means provides a limiting of the travel path. Employing a proportional valve as a control valve has the advantage that the traversing speed of the drive can be precisely specified.

The mechanical limiting of the travel path, at the control valve, represents a simple but effective possibility for limiting the traversing speed. The through-flow through the control valve can hereby be simply but effectively limited, so that the traversing speed can be limited to a fixedly pre-specified maximum value in the emergency operation.

The further development that the mechanical limiting is ensured through a hand lever adjustable in an emergency operation is particularly advantageous, wherein the hand lever is adjustable between two stops, which mechanically limit the adjustment. With the hand levers, activatable in the emergency operation, a simple possibility, for one, is provided to adjust the control valve in the emergency operation. The stops, between which the hand lever can be adjusted, additionally offer a simple but effective mechanical limiting of the possible adjusting path on the control valve in the emergency operation.

The configuration that for the emergency operation the hand lever is arranged between the stops is further advantageous, wherein the hand lever does not contact the stops in the normal operation. That the hand levers are arranged between the stops for the emergency operation is of particular advantage here. In the normal operation, the hand lever should preferably be demounted, so that the control valve can be actuated via the complete adjustment path. The hand lever is only mounted on the control valve for the emergency operation.

An advantageous embodiment of the invention provides that the control valve has a travel path, and the limiting means provides an electronic limiting of the travel path. Through the electronic actuation of the proportional valve, a limiting of the travel path at the valve can very easily be provided. This limiting of the travel path leads to a limiting of the traversing speed, in the emergency operation, to the fixedly pre-specified maximum value. By means of the electronic limiting of the travel path, fixed speeds can be systematically specified for the individual drives.

According to an advantageous embodiment of the invention, it is provided that the electronic limiting is ensured by an emergency control used in emergency operation, wherein for actuating the control valve, the emergency control provides an electrical voltage that is lower compared to the electrical voltage provided by the control device. The electrical voltage reduced in emergency operation causes a simple limiting of the travel path on the proportional valve. A preferred embodiment correspondingly provides that the reduced voltage of the emergency control shortens the travel path of the control valve. According to an advantageous configuration of the invention, it can e.g. be provided that the voltage for actuation of the control valve, in the normal operation, lies between −9 volt and +9 volt, and the reduced voltage for the actuation of the control valve, in the emergency operation, lies between −4 volt and +4 volt.

An advantageous embodiment of the invention lies with ensuring the electronic limiting through a potentiometer used in the emergency operation, wherein the potentiometer has a limited maximum output signal. The usage of a potentiometer in the actuation of the proportional valve, in the emergency operation, can lead to an effective limiting of the travel path on the control valve, if the output signal of the potentiometer is limited. With the potentiometer, a simple possibility is given to pre-specify variable traversing speeds for the drives.

In the case of a digital actuation of the control valve, a corresponding limiting of the travel path can, in the emergency operation, also occur through an electronic limiting.

A preferred embodiment provides that the limiting means is configured as an emergency valve connected in parallel to the control valve. Such an emergency valve connected in parallel can be used for the manual controlling of the drive in the emergency operation, if the control valve no longer can reliably be controlled.

An advantageous embodiment of the invention provides that the emergency valve for the shifting in the emergency operation comprises activatable hand levers. A simple manual controlling of the emergency valve is possible with these hand levers.

The emergency valve expediently provides a limiting of the maximum possible flow rate of the hydraulic fluid compared with the normal operation, in order to thereby correspondingly limit the traversing speed. The emergency valves correspondingly provided for all drives of the articulated mast can be electrically actuated, for which an electrical emergency controller can be provided, separate from the mast controller provided for the normal operation. Through simple electrically controlled on- and off-switching of the emergency valves, the mast can, in the emergency operation, still be made to traverse slowly.

A preferred embodiment provides that a further quick-traverse valve, connected in parallel to the control valve and/or the emergency valve, is provided, which is available for a particularly fast adjustment of the corresponding mast segment. Such a quick-traverse-valve can, in the normal operation, ensure a sufficiently high flow rate, so that the traversing speed of the drive makes the utilization of the maximum permitted speed possible for the mast movement.

An advantageous embodiment of the invention is that the limiting means provides a centralized limiting of the hydraulic pressure made available by a hydraulic pump at the hydraulic working lines. The centralized limiting of the hydraulic pressure offers a further effective possibility to limit the speed of the drive in the emergency operation. In order to be able to particularly exactly limit the speed of a drive through the centralized specification of the hydraulic pressure, it is of advantage if the simultaneous activation of multiple control valves is prevented or blocked for different drives on the articulated mast in emergency operation.

An advantageous configuration of the invention is that the limiting means provides a centralized limiting of the hydraulic fluid volume made available by a hydraulic pump at the hydraulic working lines. The centralized limiting of the hydraulic fluid volume offers a further effective possibility to limit the traversing speed of the drive in the emergency operation. In order to be able to particularly exactly limit the traversing speed of a drive by centralized specification of the hydraulic fluid volume, it is of advantage if the simultaneous activation of multiple control valves for different drives on the articulated mast, is prevented or blocked in the emergency operation.

Further advantageous is the configuration that the limiting means is configured as a pressure balance, e.g. section pressure balance or input pressure balance, which, in the emergency operation, is set such that it limits the hydraulic pressure made available by a hydraulic pump at the hydraulic working lines with respect to the set hydraulic pressure in the normal operation to a lower value. The regulation of the hydraulic pressure made available at the hydraulic pressure lines constitutes a further effective possibility to limit the traversing speed of the drive in the emergency operation.

Further advantageous is the configuration that the limiting means provides a central limiting of the hydraulic fluid volume made available by a hydraulic pump at the hydraulic working lines. This can e.g. be made, in a swash-plate design, for the emergency operation, through a limiting of the pivot angle of the control piston, in an axial piston hydraulic pump. In addition, the rotational speed of the drive of the hydraulic pump, for example of a diesel motor could, in the emergency operation, be reduced so that the hydraulic fluid volume conveyed by the hydraulic pump is reduced.

The reduction of the pilot pressure constitutes another possibility for the pilot valve to effectively limit the traversing speed of a drive in the emergency operation. This possibility is particularly suitable if the control slides of the control valves are not directly activated via hand levers, but rather through pilot valves which, in turn, are activatable through hand levers.

A preferred embodiment provides that the control device, in the normal operation, is set up to proportionally actuate the individual drives according to a travel command, wherein the travel command specifies the target speed of the drives. The travel command here results, for example, from the signals of a remote control, which is used by an operator of the large manipulator to control the mast movement. The control device actuates the individual drives such that the respective traversing speed corresponds to the target speed according to the travel command.

According to an advantageous configuration of the invention, it is provided that the control device, in the normal operation, is further set up to determine the speed of the tip of the articulated mast resulting from the travel command, the mast segment lengths and the output signal of the mast sensor system.

An advantageous embodiment of the invention provides that the control device, in the normal operation, is further set up to reduce the speed defaults of the individual drives with respect to the travel command, as soon as the travel command would lead to an exceeding of the speed of the tip of the articulated mast beyond a pre-specified threshold value.

According to an advantageous configuration of the invention, it is provided that the control device is set up to regulate the speed of the tip of the articulated mast, in the normal operation, through actuation of the drives to a value which is smaller or equal to the pre-specified threshold value.

In one possible configuration, the control device reduces the speeds of all drives relative to the travel command by the same factor so that the speed of the tip of the articulated tip is always smaller than or equal to the pre-specified threshold value, namely independently of the momentary mast position, which results from the sensorially detected pivot angles of the articulated joints.

In a further preferred configuration, the control device is designed to derive the travel command, i.e. the target speeds of the individual drives, from an operating signal, which specifies the target movement of the tip of the articulated mast. This is to be seen in conjunction with a so-called Cartesian or cylindrical control of the articulated mast, in which the operator does not specify the traversing speeds of the individual drives, by means of the remote control, but rather directly controls the movement of the mast tip. From this operating signal, the control device of the large manipulator according to the invention can derive and regulate the target speeds of the individual drives, and here automatically ensure compliance with the speed limits of the mast movement in all mast positions. According to the invention, higher speeds of the individual drives are permitted, in this Cartesian or cylindrical control, relative to the prior art, in the normal operation. This is in particular of advantage if the mast finds itself in the vicinity of so-called unique positions, at which higher speeds of the individual drives are required for a precise implementation of the movement specifications for the mast tip. This is the case, for example, in a completely outstretched mast, if a movement of the mast tip is pre-specified by the user, in which the horizontal distance of the mast tip to the turntable is meant to be reduced in a simultaneous maintenance of the height of the mast tip. The invention thus makes possible, in the vicinity of this unique position, a substantial improvement of the behavior of the system, with Cartesian or cylindrical mast controlling.

A preferred embodiment provides that the control device is set up to determine the kinetic energy of the articulated mast and to limit the mast speed such that a maximum kinetic energy of the articulated mast is not exceeded in its movement. With this measure, the occurrence of a mechanical overloading of the articulated mast, in an abrupt acceleration or delaying of the mast movement, is prevented.

The control device can, to avoid a mechanical overloading of the articulated mast, also include a ramp control for the speed, if necessary in connection with a vibration damping. The acceleration or the braking of the articulated mast movement can hereby be limited.

The invention makes it possible to allow for higher traversing speeds at individual articulated joints of the articulated mast, so that the legally pre-specified framework for the mast speed can be made better use of with respect to the prior art. The sensory detection of the mast position and the derivation of the mast kinematics from the pivot angles, here is the basis of a regulating of the traversing speeds of the drives, in which the compliance with legal speed limits is ensured. Simultaneously, the articulated mast can, in the normal operation, be displaced significantly faster in most practical situations, than in the large manipulators from the prior art. In the unfolding and folding of the articulated mast, large time-related advantages result with respect to the already known systems.

In the method according to the invention, the speed of the mast movement is, in a normal operation, limited depending upon the momentary output signals of the mast sensor system, wherein the speed of the mast movement, in an emergency operation, is limited, in that the traversing speed of at least one of the drives is limited to a fixedly pre-specified maximum value. That is, in the method according to the invention, the speed of the mast movement, in a normal operation, is limited, in that the traversing speed of at least one of the drives is limited to a variable maximum value dependent upon the momentary output signals of the mast sensory system, wherein the speed of the mast movement is limited, in an emergency operation, in that the traversing speed of at least one of the drives is limited to a fixedly pre-specified maximum value.

Figure 3:
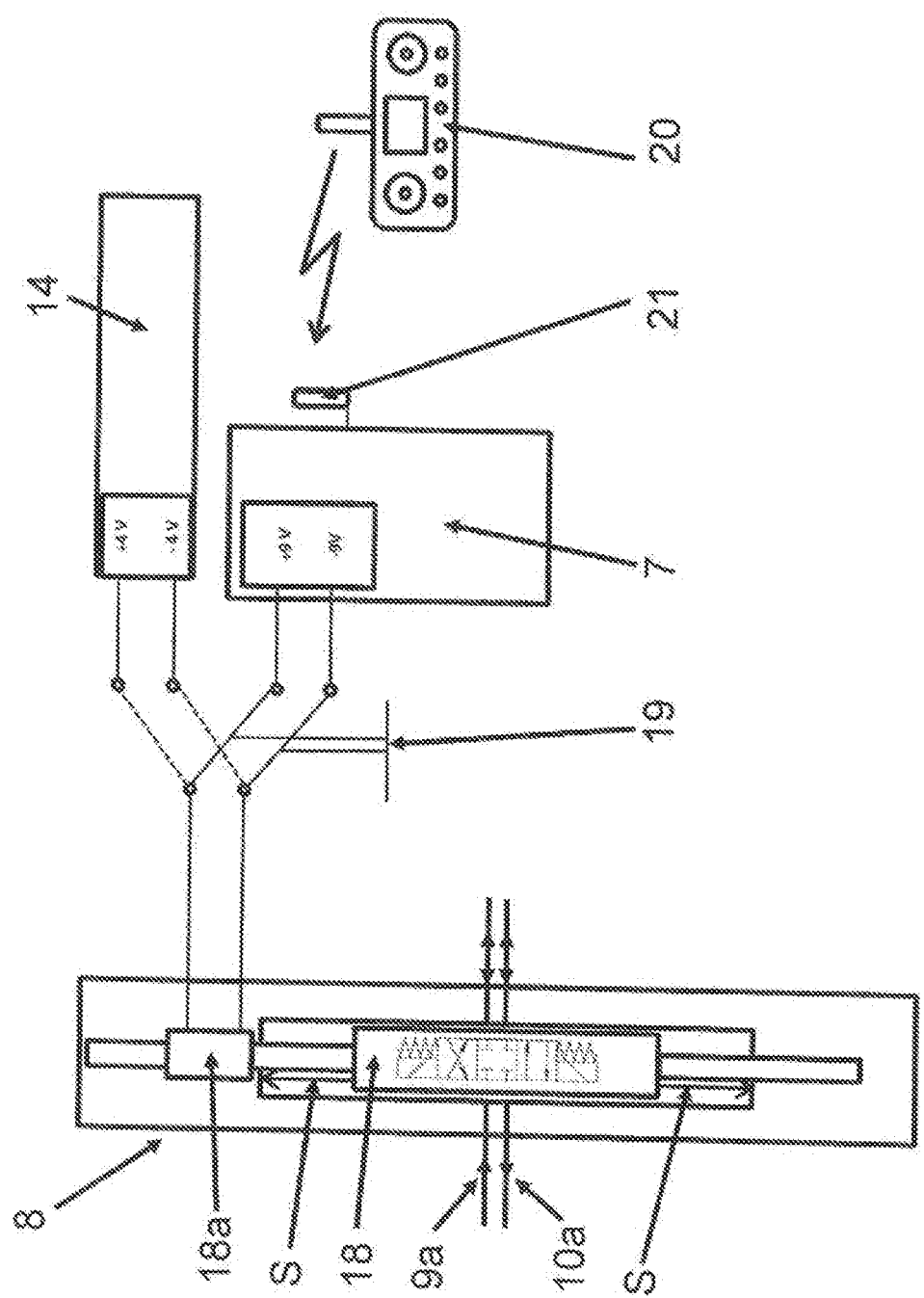

Further features, details and advantages of the invention result due to the following description, as well as based on the illustrations. Exemplary embodiments of the invention are shown purely schematically in the following illustrations, and are further described in the following. Mutually corresponding subject-matters or elements are provided with the same reference characters throughout the figures. Shown are in:

FIG. 1: a large manipulator according to the invention with an articulated mast in a configuration, FIG. 2a: a control valve, FIG. 2b: a control valve with a hand lever, FIG. 3: a control valve with electric emergency controller, The representation according to FIG. 1 schematically shows a large manipulator 1 configured as a truck-mounted concrete pump, with a chassis 2, on which a turntable 3 is arranged which, by means of a hydraulic rotary drive 6, is rotatable around an upright axis 16 of the large manipulator 1. An articulated mast 4, denoted in totality with the reference character 4, is hinged on the turntable 3, which mast, in the illustrated exemplary embodiment, includes four mast segments 5a, 5b, 5c, and 5d. The first mast segment 5a is arranged pivotally movably around a horizontal axis on the turntable 3, via a joint. The pivotal movement is effected through a pivot drive 6a. The remaining mast segments 5b, 5c and 5d are pivotally movably connected, via articulated joints, around horizontal axes parallel to one another, with the respectively connected mast segments 5a, 5b, 5c, 5d. The pivotal movement likewise respectively effects a pivot drive 6a, 6b, 6c, 6d. The pivot drives 6a, 6b, 6c, 6d each comprise one (or multiple) hydraulic cylinders, which are actuated via proportionally working control valves 8 (FIG. 2a, 2b, 3). These, in turn, are controlled by an electronic control device 7 (FIG. 3) for the mast movement.

The large manipulator 1 according to the invention comprises a mast sensor system (e.g. in the form angle sensor for the joints, path sensors for the detection of the piston positions of the individual hydraulic cylinders or geodetic inclination sensors). With the aid of the mast sensor system, the pivot angles $\varphi_1$, $\varphi_2$, $\varphi_3$ and $\varphi_4$, of the articulated joints, are detected, for example, wherein the control device 7 (FIG. 3), in the normal operation, controls, through corresponding actuation of the control valves 8 (FIG. 2a, 2b, 3) of the hydraulic cylinders, the speed of the mast movement, dependent upon the momentary pivot angles $\varphi_1$, $\varphi_2$, $\varphi_3$ and $\varphi_4$ of the articulated joints. A control device 7 (FIG. 3) actuating the drives 6, 6a, 6b, 6c, 6d in a normal operation is set up to control the mast movement of the articulated mast 4. To that end, the position of at least one point of the articulated mast 4 or a pivot angle $\varphi 1$, $\varphi 2$, $\varphi 3$, $\varphi 4$ of at least one articulated joint is detected, in the normal operation, via the mast sensor system. In the normal operation, the speed of the mast movement is limited through the control device 7 (FIG. 3), depending upon the momentary output signals of the mast sensor system. This takes place in particular in that the traversing speed of at least one of the drives 6, 6a, 6b, 6c, 6d is limited to a variable maximum value dependent upon the momentary output signals of the mast sensor system. In the emergency operation, such as in a malfunction of the mast sensor system or other electronic components, the drives 6, 6a, 6b, 6c, 6d are manually controllable. At least one limiting means 11, 12, 13, 14 (FIG. 2a, 2b, 3) is provided for the emergency operation, which means limits the traversing speed of at least one of the drives 6, 6a, 6b, 6c, 6d to a fixedly pre-specified maximum value.

This maximum value, fixedly pre-specified for the individual drives 6, 6a, 6b, 6c, 6d, is configured such that, even in a simultaneous traversing of all drives 6, 6a, 6b, 6c, 6d, the maximally permitted speed of the mast movement cannot be exceeded. If, in the emergency operation, the simultaneous operation of multiple drives 6, 6a, 6b, 6c, 6d is not possible, the limiting means can be designed such that, in the traversing of the selected drive 6, 6a, 6b, 6c, 6d, the permitted speed of the mast movement is not exceeded.

FIG. 2a schematically shows a control valve 8, which is connected with the hydraulic working lines 9b, 10b to actuate a drive 6, 6a, 6b, 6c, 6d (FIG. 1). Each of the drives 6, 6a, 6b, 6c, 6d (FIG. 1) is assigned a distinct control valve 8. Via hydraulic working lines 9a, 10a, the control valve 8 is connected with a hydraulic pump (not illustrated) which provides the hydraulic pressure or the necessary hydraulic fluid volumes necessary for the traversing of the articulated mast. The drive 6, 6a, 6b, 6c, 6d (FIG. 1) is supplied with hydraulic pressure via the hydraulic working lines 9b, 10b by the control valve 8, so that the drive 6a, 6b, 6c, 6d (FIG. 1) pivots the mast segments 5a, 5b, 5c, 5d (FIG. 1) against one another via the articulated joint or the drive 6 causes a pivotal movement of the articulated mast 4. The control valve 8 is actuated, in the normal operation, via the control device 7 (FIG. 3), in order to effect the mast movement of the articulated mast 4 via the actuation of the valve piston 18 by means of the valve piston control device 18a. The electronic actuation of the control valve 8 can, as shown in FIG. 3, occur via a variable voltage signal, but also, for example, via an electronic digital signal. The control device 7 (FIG. 3) limits the movement of the mast segment 5a, 5b, 5c, 5d (FIG. 1), in the articulated joint or in the turntable 3 in such a manner that the speed of the mast movement is limited depending upon the momentary output signals of the mast sensor system. This occurs in particular in that the traversing speed of the drive 6, 6a, 6b, 6c, 6d (FIG. 1) is limited to a variable maximum value, dependent upon the momentary output signals of the mast sensor system. In this way, the control device 7 (FIG. 3) can limit the speed of the mast movement, so that a pre-specified mast speed is not exceeded.

The valve piston 18 of the control valve 8, embodied as proportional valve, according to FIG. 2a, comprises an travel path S indicated by two vertical arrows. In order to limit the traversing speed of the drive 6, 6a, 6b, 6c, 6d (FIG. 1) to a fixedly pre-determined maximum value, in the emergency operation, a mechanical limiting of the adjustment path S is provided. This mechanical limiting is represented in FIG. 2b. In the emergency operation, a hand lever 11 is fitted onto the socket 17. This hand lever 11 is then displaceable between the two stops 12, 13, in the emergency operation, wherein the stops 12, 13 mechanically limit the displacement. This is indicated in FIG. 2b through the hand levers 11 indicates in dashed line, in the two stopping positions. Through the displacement of the hand lever 11, the drive 6, 6a, 6b, 6c, 6d (FIG. 1) is manually controllable, in the emergency operation, via the control valve 8. As is to be can be taken from FIG. 2a, the non-fitted hand lever does not contact the stops 12, 13 in the normal operation, so that the travel path S of the control valve 8 is not mechanically limited here. The displacement, at the control valve 8, is thusly possible, in the normal operation, via the full piston travel. An unimpaired actuation of the valve piston 18 of the control valve 8 hereby occurs, via the electronic or hydraulic valve piston activation device 18a, through the control device 7 (FIG. 3) to adjust the mast segment 5a, 5b, 5c, 5d (FIG. 1) in the normal operation. In the normal operation, the socket 17 is pivotable by about 80 degrees, which is indicated through the dashed outlines, while the limiting, in the emergency operation, permits a pivot angle of the hand lever 11 of around 40 degrees through the stops 12, 13 on the slotted link. In the emergency operation, the electronic or hydraulic valve piston activation device 18a is out of service. In the emergency operation, only one control valve 8 for the drives 6, 6a, 6b, 6c, 6d, for example, ca be actuated with a single hand lever, so that a simultaneous traversing of multiple drives 6, 6a, 6b, 6c is not possible. In this case, the limiting is designed such that the maximum permitted mast movement speed is not possible in the actuation of a drive 6, 6a, 6b, 6c, 6d.

The shown control valve 8 can be a 4/3-way proportional valve, with which the hydraulic cylinder is directly actuated. The control valve 8 can also be configured as a pilot valve or relay valve for the actuation of the 4/3-way proportional valve.

FIG. 3 shows a control valve 8 configured as a proportional valve. The travel path S of the valve piston 18 is indicated by the two vertical arrows. The adjustment of the valve piston 18 on the travel path S occurs via the electrical valve piston activation device 18a. The valve piston activation device 18a is actuated via the control device 7, in the normal operation, which device receives travel commands from the user of the large manipulator 1 (FIG. 1) by means of the remote control 20 and the receiver 21. In the emergency operation, a means for electronic limiting of the travel path S is provided. The traversing speed of the drive 6, 6a, 6b, 6c, 6d (FIG. 1) can hereby be limited to a fixedly pre-specified maximum value. In the shown exemplary embodiment, the electronic limiting is provided through an emergency controller 14 used in the emergency operation. The emergency controller 14 makes an electrical voltage for actuating the valve piston activation device 18a available, reduced relative to the voltage made available through the control device 7 in the normal operation. Through the reduced voltage of the emergency controller 14, the travel path S of the control valve is limited in the emergency operation, so that the traversing speed of the drive 6, 6a, 6b, 6c, 6d is limited to a fixedly pre-specified maximum value.

In the normal operation, the control device 7 makes a voltage between −9 V and +9 V available for actuating the control valve 8, so that the valve piston 18 can be displaced through the valve piston activation device 18a over the full piston path. A changeover switch 19 is provided for switching over between normal operation and emergency operation. The actuation of this changeover switch 19 leads to the articulated mast 4 (FIG. 1) being able to be displaced, in the emergency operation, via the electric emergency controller. The emergency controller 14, to that end, makes available a fixedly set reduced voltage of, for example, +4 V and −4 V, for actuating the control valve 8 via the valve piston activation device 18a, whereby the travel path of the control valve 8 is correspondingly shortened. The voltage of the emergency controller for actuating the control valves 8 can, however, also be regulated from −4 V to +4 V. In this way, it can be ensured that the traversing speed of the drive 6, 6a, 6b, 6c, 6d (FIG. 1) is limited to a fixedly pre-specified maximum value in the emergency operation. The shown control valve 8 can relate to a 4/3-way proportional valve, with which the hydraulic cylinder is directly actuated. The control valve 8 can, however, also be configured as a pilot valve or relay valve for actuating a 4/3-way proportional valve.

If multiple control valves 8 or drives 6, 6a, 6b, 6c, 6d can be simultaneously controlled via the emergency controller 14, the limiting can, for example, be configured such that, in a simultaneous traversing movement of multiple of the drives 6, 6a, 6b, 6c, 6d, the maximum permitted speed of the mast movement is not exceeded.

The following is a detailed explanation of an exemplary embodiment of an algorithm for mast controlling, in the normal operation, based on an articulated mast of a large manipulator, which comprises an arbitrary number of N joints, and is anchored to a fixed point on the chassis 2 with a turntable 3. FIG. 1 representatively shows the case of a truck-mounted concrete pump 1 with an articulated mast 4 comprising N=4 joints. The elastic deformation of the individual mast segments 5a, 5b, 5c, 5d is neglected, so that these are considered as rigid bodies. The description of the kinematics of the system is required for establishing the speed of the end point EP of the articulated mast 4, which corresponds to the mast tip 15 in the following. The rigid body angles $\varphi_i$ for i=1, ..., N, as well as the rotation angle $\theta$ of the turntable 3, around the vertical rotary axis thereof, are the degree of freedom of the system. The absolute movements of the system are described in the inertial coordinate system $0_0 x_0 y_0 z_0$, i.e. in the coordination system that is fixed with respect to the chassis 2. With $0_d x_d y_d z_d$, that coordinate system is denoted, which is rotated relative to the inertial coordinate system by the rotation angle $\theta$. Moreover, a local coordinate system $0_i x_i y_i z_i$ is defined for each mast segment 5a, 5b, 5c, 5d, the $x_i$ axis of which system extends along the longitudinal axis of the respective mast segment 5a, 5b, 5c, 5d. As the mast segments typically have a bend, for i≥2, at the beginning, the longitudinal axis thereof does not intersect the respective joint axis. The origin of each local coordinate system is therefore set at the point of intersection of the longitudinal axis with that orthogonal straight line which extends through the joint axis. The spaces between the joint axes and the origins of the local coordinate systems are denoted with $D_i$ for i=2, ..., N.

The kinematic relationships between the local coordinate systems and the inertial coordinate system can be represented with rotation matrixes and translation vectors. The inertial coordinates of a point on the longitudinal axis of the i-th mast segment $r_1^i(x_i)=[x_i, 0, 0]^T$, described in the local coordinate system i (characterized by the index below), are specified through $$r_0^i(x_i) = R_0^i r_i^i(x_i) + d_0^i$$

The matrix $$R_0^i = R_0^d R_d^1 R_1^2 \ldots R_{i-1}^i$$

with $$R_0^d = \begin{bmatrix} \cos(\theta) & 0 & -\sin(\theta) \\ 0 & 1 & 0 \\ \sin(\theta) & 0 & \cos(\theta) \end{bmatrix}$$

$$R_d^1 = \begin{bmatrix} \cos(\varphi_1) & -\sin(\varphi_1) & 0 \\ \sin(\varphi_1) & \cos(\varphi_1) & 0 \\ 0 & 0 & 1 \end{bmatrix}$$

and $$R_{j-1}^j = \begin{bmatrix} \cos(\varphi_j) & -\sin(\varphi_j) & 0 \\ \sin(\varphi_j) & \cos(\varphi_j) & 0 \\ 0 & 0 & 1 \end{bmatrix}$$

for j=2, . . . , N describes the rotation of the local coordinate system $0_i x_i y_i z_i$ relative to the inertial coordinate system $0_0 x_0 y_0 z_0$. The translational displacement $d_0^i$ between the local coordinate system $0_i x_i y_i z_i$ and the inertial coordinate system $0_0 x_0 y_0 z_0$ is specified through $$d_0^j = R_0^{j-1} d_{j-1}^j + d_0^{j-1}$$

for j=2, . . . , N with $d_0^i=[0, 0, 0]^T$, and $$d_{j-1}^j = R_{j-1}^j \begin{bmatrix} 0 \\ D_j \\ 0 \end{bmatrix} + \begin{bmatrix} L_{j-1} \\ 0 \\ 0 \end{bmatrix}$$

Here, $L_j$ refers to the length of the j-th mast segment.

The inertial coordinates of the end point EP of the N-th mast segment can thusly be represented as a function of the positions of the N joints and of the und turntable 3 through $r_{0,N}^{EP}(q) = r_0^N(L_N)$ with the vector of the degrees of freedom $q=[\theta, \varphi_1, \ldots, \varphi_N]^T$. The speed of the end point EP in the direction of the individual coordinate axes results through differentiation after the time at $$\dot{r}_{0,N}^{EP}(q) = \frac{\partial r_{0,N}^{EP}(q)}{\partial q} \dot{q} = J_{q,N}^{EP} \dot{q}.$$

Through the employed hydraulic systems, in combination with the control device, a proportional control of the traversing speeds of the individual hydraulic cylinders 6a, 6b, 6c, 6d and of the rotary drive 5 is made possible for the operator of the large manipulator according to the invention. The resulting joint angle speeds can be determined by knowledge of the translation of the joint kinematics, based on the target speeds for the hydraulic cylinders 6a, 6b, 6c, 6d. The piston position $s_{z,i}$ of a cylinder 6a, 6b, 6c, 6d, can generally be represented as a non-linear function of the corresponding joint angle $\varphi_i$, $$s_{z,i} = f_{x,i}(\varphi_i).$$

At the speed level, the correlation $$\dot{s}_{z,i} = \frac{\partial f_{z,i}(\varphi_i)}{\partial \varphi_i} \dot{\varphi}_i$$

applies, where, from a pre-specified piston speed $\hat{s}_{z,i}^d$, the resulting joint angle speed can be established. Moreover, with this correlation, the corresponding piston speed can be calculated, reversed, from a pre-specified joint angle speed. Thusly, a uniform, proportional control of the joint angle speeds is made possible for the user. This is of particular advantage for the user, as the generally non-avoidable non-linearity of the joint kinematics is thereby compensated. The vector $$\dot{q} = [\dot{\theta}^d, \dot{\varphi}_1^d, \ldots, \dot{\varphi}_N^d]^T$$

is therefore representative for the user inputs, i.e. the travel command in the context of the invention, which specifies the target speeds of the drives, or directly of the joints. The use of a suitable mast sensor system is necessary for the detection of the joint positions or of the degree of freedom q.

The absolute speed of the boom tip EP is specified by $$v^{EP} = \sqrt{\dot{q}^T (J_{q,N}^{EP})^T J_{q,N}^{EP} \dot{q}}.$$

If said absolute speed exceeds the maximum permitted speed $v^{EP}_{max}$, all speeds of the drives 6, 6a, 6b, 6c, 6d will be uniformly, i.e. by the same factor, reduced, through the control device, relative to the target speeds pre-specified through the travel command. A vector $\dot{q}_{red}$ is thusly sought, for which $$v^{EP}_{max} = \sqrt{\dot{q}_{red}^T (J_{q,N}^{EP})^T J_{q,N}^{EP} \dot{q}_{red}}$$

applies. Through the requirement for the simultaneous reduction of the speeds, this problem permits itself to be clearly solved and simplified, to the determination of a factor $k_{red} \in \mathbb{R}$, with $\dot{q}_{red} = k_{red} \dot{q}$. Thusly $$v^{EP}_{max} = \sqrt{k_{red}^2 \dot{q}^T (J_{q,N}^{EP})^T J_{q,N}^{EP} \dot{q}}$$

applies, where from the correlation $$k_{red} = \frac{v^{EP}_{max}}{\sqrt{\dot{q}^T (J_{q,N}^{EP})^T J_{q,N}^{EP} \dot{q}}}$$

follows. The result for the modified travel command $\dot{q}_{red}$, i.e. with speeds reduced relative to the user-sided specification $\dot{q}$ is finally $$\dot{q}_{red} = \frac{v^{EP}_{max}}{\sqrt{\dot{q}^T (J_{q,N}^{EP})^T J_{q,N}^{EP} \dot{q}}} \dot{q}.$$

The control device actuates the rotary drive 6 and the hydraulic cylinder 6a, 6b, 6c, 6d in accordance with this modified travel command, and limits the movement speed thereof, so that the mast tip EP never moves faster than legally permitted. Simultaneously, the traversing speed can be maximally fast within the legal framework, in any desired mast position, whereby considerable time can be saved in the unfolding and folding of the articulated mast 4, but also in the displacement of the mast between to working positions, relative to the prior art.

The invention, in brief summary, relates to a large manipulator 1, in particular a truck-mounted concrete pump, with a turntable 3 rotatable around a vertical axis by means of a rotary drive, which table is arranged on a chassis 2, an articulated mast 4, which includes two or more mast segments 5a, 5b, 5c, 5d, wherein the mast segments 5a, 5b, 5c, 5d are pivotally movably connected, via articulated joints, with the respectively adjacent turntable 3 or mast segment 5a, 5b, 5c, 5d, by means of in each case one drive (6, 6a, 6b, 6c, 6d), with a control device 7 actuating the drives 6, 6a, 6b, 6c, 6d in a normal operation for the mast movement, and a mast sensor system for detecting the condition of at least one point of the articulated mast (4), or of a pivot angle $\varphi1$, $\varphi2$, $\varphi3$, $\varphi4$ of at least one articulated joint. It is the object of the invention to be able to bring the articulated mast from the completely folded state into its desired working position in minimal time. Likewise, it is to be ensured, also in case of a failure of the mast sensor system, that the traversing speed of the drives complies with legal standards. To that end, the invention proposes that the control device 7 is configured to limit the speed of the mast movement in that the mast speed is limited to a maximum value depending on the momentary output signals of the mast sensor system, wherein the drives 6, 6a, 6b, 6c, 6d can be manually controlled in emergency operation, wherein at least one limiting means 11, 12, 13, 14 is provided, which, in emergency operation, limits the traversing speed of at least one of the drives 6, 6a, 6b, 6c, 6d to a fixedly specified maximum value. The invention also relates to a method for controlling the movement of an articulated mast of a large manipulator.

list of reference characters

LIST OF REFERENCE CHARACTERS

1 large manipulator
2 chassis
3 turntable
4 articulated mast
5 5a, 5b, 5c, 5d mast segment
6 6a, 6b, 6c, 6d drive
7 control device
8 control valve
9 9a, 9b hydraulic working line
10 10a, 10b hydraulic working line
11 hand lever
12 stop
13 stop
14 electric emergency controller
15 mast tip
16 upright axis
17 socket of hand lever
18 valve piston 18a valve piston actuation device
19 changeover switch
20 remote control
21 receiver

The invention claimed is:

1. A large manipulator comprising:
a chassis;
a turntable arranged on the chassis and rotatable around a vertical axis via a rotary drive;
an articulated mast including two or more mast segments pivotably-movably connected, via articulated joints, with the respectively adjacent turntable or mast segment via a respective drive;
a mast sensor system configured to detect position of at least one point of the articulated mast or a pivot angle of at least one of the articulated joints and configured to generate sensor output signals;
a control device configured to actuate the drive in a normal operation for mast movement and to limit the speed of movement of the articulated mast depending upon the sensor output signals, wherein the drive is manually controllable in an emergency operation; and
at least one limiting means, which, in the emergency operation, limits speed of the drive to a pre-specified maximum value.

2. The large manipulator according to claim 1, wherein a control valve is connected to hydraulic working lines of the drive for the actuation thereof, wherein the control valve, in the normal operation, is actuated via the control device, which limits adjusting of the mast segment such that a pre-specified traversing speed is not exceeded.

3. The large manipulator according to claim 1, wherein the control valve is a proportional valve and has a travel path, wherein the at least one limiting means limits the travel path.

4. The large manipulator according to claim 1, wherein the at least one limiting means mechanically limits a travel path of the control valve.

5. The large manipulator according to claim 4, wherein the at least one limiting means includes a hand lever adjustable in the emergency operation, wherein the hand lever is adjustable between two stops, which mechanically limit adjustment.

6. The large manipulator according to claim 1, wherein the at least one limiting means electronically limits a travel path of the control lever.

7. The large manipulator according to claim 6, wherein the at least one limiting means includes an electric emergency control used in the emergency operation, wherein the emergency control provides an electrical voltage for actuating the control valve that is reduced compared to the electrical voltage provided by the control device in the normal operation.

8. The large manipulator according to claim 7, wherein the reduced voltage of the emergency control shortens the travel path.

9. The large manipulator according to claim 1, wherein the at least one limiting means includes an emergency valve connected in parallel to the control valve.

10. The large manipulator according to claim 9, wherein the emergency valve comprises activatable hand levers.

11. The large manipulator according to claim 9, wherein the emergency valve limits flow rate of the control device.

12. The large manipulator according to claim 1, further comprising a quick-traverse valve, connected in parallel to the control valve and/or an emergency valve for fast adjustment of the mast segment.

13. The large manipulator according to claim 1, wherein the at least one limiting means provides a centralized limitation of hydraulic pressure made available by a hydraulic pump at hydraulic working lines of the control valve.

14. The large manipulator according to claim 1, wherein the at least one limiting means provides a centralized limitation of hydraulic fluid volume made available by a hydraulic pump at hydraulic working lines of the control valve.

15. The large manipulator according to claim 1, wherein the at least one limiting means is configured as a pressure balance, which, in the emergency operation, is set such that it reduces hydraulic pressure made available by a hydraulic pump on hydraulic working lines of the control valve with respect to set hydraulic pressure in the normal operation.

* * * * *